(12) United States Patent
Wang (10) Patent No.: US 8,695,070 B2
(45) Date of Patent: *Apr. 8, 2014

(54) USER IDENTIFICATION METHOD APPLICABLE TO NETWORK TRANSACTION AND SYSTEM THEREOF

(75) Inventor: Ching-Feng Wang, Taipei (TW)

(73) Assignee: Fonestock Technology Inc., Taipei (TW)

( * ) Notice: Subject to any disclaimer, the term of this patent is extended or adjusted under 35 U.S.C. 154(b) by 181 days.

This patent is subject to a terminal disclaimer.

(21) Appl. No.: 13/433,514

(22) Filed: Mar. 29, 2012

(65) Prior Publication Data

US 2012/0297465 A1 Nov. 22, 2012

(30) Foreign Application Priority Data

May 19, 2011 (TW) .............................. 100117529 A (51) Int. Cl.
*G06F 21/00* (2013.01)
*G06F 7/04* (2006.01)
*G06F 17/30* (2006.01)

(52) U.S. Cl.
USPC ......... 726/6; 705/75; 713/182; 726/7; 726/27

(58) Field of Classification Search
None
See application file for complete search history.

(56) References Cited

U.S. PATENT DOCUMENTS

2004/0243496 A1* 12/2004 Kim et al. ....................... 705/35

OTHER PUBLICATIONS

Steffen Hallsteinsen, Do Van Thanh, Ivar Jorstad, Using the mobile phone as a security token for unified authentication, Second International Conference on System and Networks Communications (ICSNC 2007) 0-7695-2938-0/07 @ 2007 IEEE.*

* cited by examiner

*Primary Examiner* — Philip Chea
*Assistant Examiner* — Fatoumata Traore
(74) *Attorney, Agent, or Firm* — Amin, Turocy & Watson, LLP (57) ABSTRACT

A user identification method and a system thereof are provided. A user device delivers a certificate packet with a user identification number to a certificate server, and receives a reply packet with a code from a password server. The user device uses the code to produce a user terminal identification code, and delivers an identification packet with the user terminal identification code to the certificate server. After having received the certificate packet, the certificate server delivers an inquiry packet with the user identification number to the password server, for the password server to inquire about the password and expiration time according to the user identification number. After having received the identification packet, the certificate server verifies the validity of the user terminal identification code and the expiration time with a database to determine whether the user is allowed to proceed to the subsequent transaction.

14 Claims, 5 Drawing Sheets

| User Identification Number | Expiration |
|---|---|
| A123 | 3 minutes |
| B456 | 3 minutes |
| C789 | 3 minutes |
| D000 | 3 minutes |

| User Identification Number | Key | Password | Expiration |
|---|---|---|---|
| A123 | 234 | 1234 | 3 minutes |
| B456 | 578 | 2345 | 3 minutes |
| C789 | 901 | 3456 | 3 minutes |
| D000 | 123 | 4567 | 3 minutes |

USER IDENTIFICATION METHOD APPLICABLE TO NETWORK TRANSACTION AND SYSTEM THEREOF

BACKGROUND OF THE INVENTION

1. Field of the Invention

This invention relates to user identification methods and systems thereof, and, more particularly, to a user identification method applicable to a network transaction and a system thereof.

2. Description of Related Art

In a modern network transaction system, if a user's identity is verified to be valid, the user is allowed to proceed with various subsequent transactions. Therefore, the user identification is the most important key in the modern network transaction system. Accordingly, in a network transaction process, it is essentially important to apply secured identity identification mechanism to prevent hackers and impostors from processing various network transactions.

At present, some network transaction systems can produce a one-time password every time a transaction takes place, and for the purpose of enhancing security of the identification mechanism, the one-time password is used as user identification for every transaction. However, in such a mechanism the one-time password must be changed and then used as the user identification in every transaction, thereby causing inconvenience to the users. Besides, the one-time password is separately transmitted to the user via Internet and a telecommunication network, thereby causing rather inconvenience to the user.

In view of the above, in the prior network transaction system a one-time password is mostly used as a user's identification, however, causing inconvenience to the user. In addition, since the one-time password is separately transmitted to the user via Internet and a telecommunication network, thereby causing rather inconvenience to the user. Hence, it is a critical issue in the industry to provide a user identification method applicable to network transaction and a system thereof, which enables the user to conveniently process network transaction in an enhanced secured background.

SUMMARY OF THE INVENTION

In view of the drawback of the prior art mentioned above, it is therefore an objective of this invention to provide a user identification method applicable to a network transaction, comprising the following steps: having a user device deliver a certificate packet including a user identification number and/or a key to a certificate server via a first network; having the certificate server deliver an inquiry packet including the user identification number and/or the key to a password server; having the password server inquire about a password and an expiration time thereof based on the user identification number and/or the key, and then deliver a reply packet including a code to the user device via a second network; having the user device use the code to produce a user terminal identification code, and then deliver an identification packet including the user terminal identification code to the certificate server via the first network; and having the certificate server verify the validity of the user terminal identification code and expiration time with a database, so as to determine if a user of the user device is admitted to proceed a subsequent network transaction.

It is a further objective of the present invention to provide a user identification system applicable to network transaction, comprising: a certificate server for identifying user's identity; a password server for producing passwords and service terminal identification codes; a database for storing the service terminal identification code and an expiration time; and a user device connected to the certificate server and the password server via a first network and a second network, respectively, wherein the user device delivers a certificate packet with a user identification number to the certificate server via the first network, so as for the certificate server to deliver an inquiry packet with the user identification number to the password server. Accordingly, the password server inquires about the password and the expiration time thereof based on the user identification number, and then delivers a reply packet with a code to the user device via the second network, thereby enabling the user device to use the code to produce a user terminal identification code, and then to deliver an identification packet with the user terminal identification code to the certificate server via the first network. At last, the certificate server verifies with the database if the user terminal identification code matches with the service terminal identification code and if the expiration time is valid.

Compared with the prior technique, in the present invention, a password is produced by the password server and the user identification number is used to verify the user while the code is used to produce the user terminal identification code. Meanwhile within the expiration time, there is no need of changing the password or identification code, and the code is transmitted via a single network, thereby providing enhanced convenience and security to the user.

BRIEF DESCRIPTION OF DRAWINGS

The invention can be more fully understood by reading the following detailed description of the preferred embodiments, with reference made to the accompanying drawings, wherein.

DETAILED DESCRIPTION OF PREFERRED EMBODIMENTS

The following illustrative embodiments are provides to illustrate the disclosure of the present invention; those in the art can apparently understand these and other advantages and effects after reading the disclosure of this specification. The present invention can also be performed or applied by other different embodiments. The details of the specification may be on the basis of different points and applications, and numerous modifications and variations can be devised without departing from the spirit of the present invention.

Figure 1:
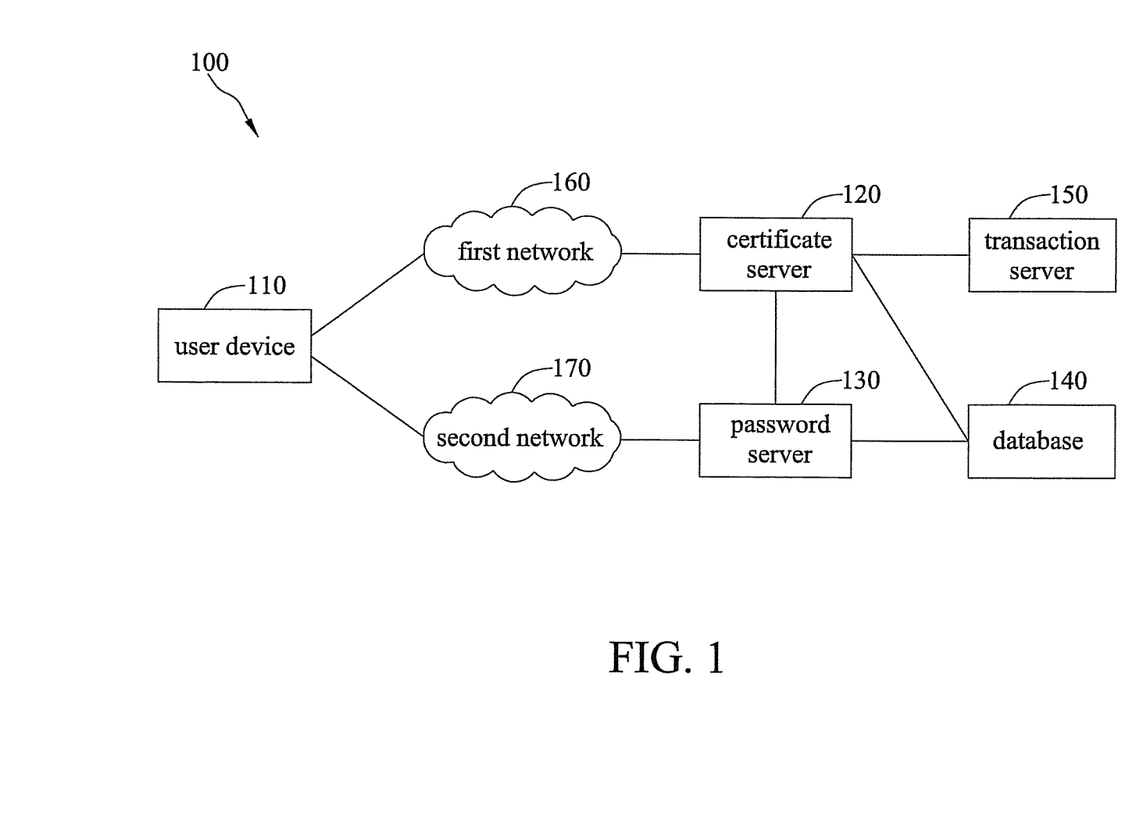
FIG. 1 is a systematic diagram illustrating a user identification system of an embodiment according to the present invention applicable to a network transaction.

Referring to FIG. 1, a systematic diagram depicting a user identification system 100 of an embodiment according to the present invention applicable to a network transaction is shown.

As shown in FIG. 1, the user identification system 100 is constructed in networks, and comprises a user device 110, a certificate server 120, a password server 130, and a database 140. The user identification system 100 is configured to verify the identity of a user using the user device 110, and, after the user's identity is verified, to perform a network transaction with a transaction platform 150. The networks include a first network 160 and a second network 170. In an embodiment, the first network 160 may be Internet, extranet and/or intranet, and the second network may be a mobile communication network and/or telecommunication network, but are not limited thereto.

The user device 110 may be any kind of intelligent cellular phones, such as BlackBerry, iPhone, HTC Touch, and etc., but are not limited thereto. In addition, the user device 110 can also be a combination of a conventional computer and cellular phone, wherein the computer is connected with the first network 160, and the cellular phone is connected with the second network 170. Moreover, the user uses the user identification number to log on the certificate server 120 via the user device 110. The user identification number may be the user's transaction account number or social security number.

The user device 110 is connected to the certificate server 120 and the password server 130 via the first network 160 and the second network 170, respectively. The user device 110 delivers certificate packets and identification packets to the certificate server 120 and receives reply packets from the password server 130. The certificate server 120 delivers transaction content to the transaction platform 150.

The certificate server 120 identifies user identities. In an embodiment of the present invention, the certificate server 120 delivers inquiry packets to the password server 130 and receives certificate packets and identification packets from the user device 110. The certificate server 120 also delivers the transaction content to the transaction platform 150.

The password server 130 produces passwords and service terminal identification codes. In an embodiment of the present invention, the password server 130 delivers reply packets and receives inquiry packets from the certificate server 120.

The database 40 saves the service terminal identification codes and the expiration time.

The transaction platform 150 receives the transaction contents, and, after the certificate server 120 verifies the validity of the user identity, allows the user to use the user device 110 to proceed with a transaction based on the received transaction contents.

According to the above-mentioned, the user device 110 first delivers a certificate packet with the user identification number to the certificate server 120 via the first network 160, thereby having the user identification number to be used as the basis of certification. The certificate server 120 delivers an inquiry packet with the user identification number to the password server 130, thereby making the user identification number to be the basis of inquiry. The password server 130 inquires about the passwords and expiration time thereof based on the user identification number. The passwords and the expiration time are saved in the database 140. The expiration time is used for indicating the validity of time period of the passwords, e.g., one-time validity, or validity within three or five minutes. The expiration time may also be used for inquiring about passwords and expiration time based on a corresponding relation between the user identification number and the passwords. On the other hand, the password server 130 uses the password and the user identification number to produce a service terminal identification code, which is produced by means of Hash Algorithm, and then saves the service terminal identification code in the database 140. The password server 130 delivers the reply packets with a code to the user device 110 via the second network 170 and thus treats the code as basis of reply, wherein the code can be the service terminal identification code (referring to FIG. 2 for detailed description), or, a password correspondingly produced by the password server 130 based on the user identification number in the inquiry packet transmitted from the certificate server 120 (referring to FIG. 3 for detailed description). The user device 110 uses the code to produce a user terminal identification number. When the code is the service terminal identification code, the user device 110 uses the service terminal identification code to produce the user terminal identification code, or, when the code is the password, the user device 110 uses the password and the user identification number to produce the user terminal identification code by means of calculation, e.g. Hash Algorithm. The user device 110 delivers the identification packet with the user terminal identification code to the certificate server 120 via the first network 160, thereby making the user terminal identification code as the basis of identification. The user device 110 then delivers transaction content to the certificate server 120. The certificate server 120 uses the service terminal identification code and expiration time saved in the database 140 to verify whether the user terminal identification code in the identification packet matches with the service terminal identification code and whether the expiration time is valid. If the user terminal identification code matches with the service terminal identification code and the expiration time is valid, the certificate server 120 delivers the transaction content to the transaction platform 150, and the transaction platform 150 proceeds to process the transaction content.

Besides, the certificate packet transmitted from the user device 110 to the certificate server 120 can also include both the key and the user identification number. Therefore, the certificate server 120 transmits the inquiry packet with the user identification number and the key to the password server 130, and then the password server 130 can inquire about the password and expiration time based on the user identification number and the key, thereby enhancing network transaction security. Besides, the key is produce by the user device 110 and based on the valid expiration time of valid time period, e.g. 3, 5, or other specified minutes, at the beginning of the valid time period by random number. The key can be produced by the user device 110 by means of a specific application, but is not limited thereto.

Figure 2:
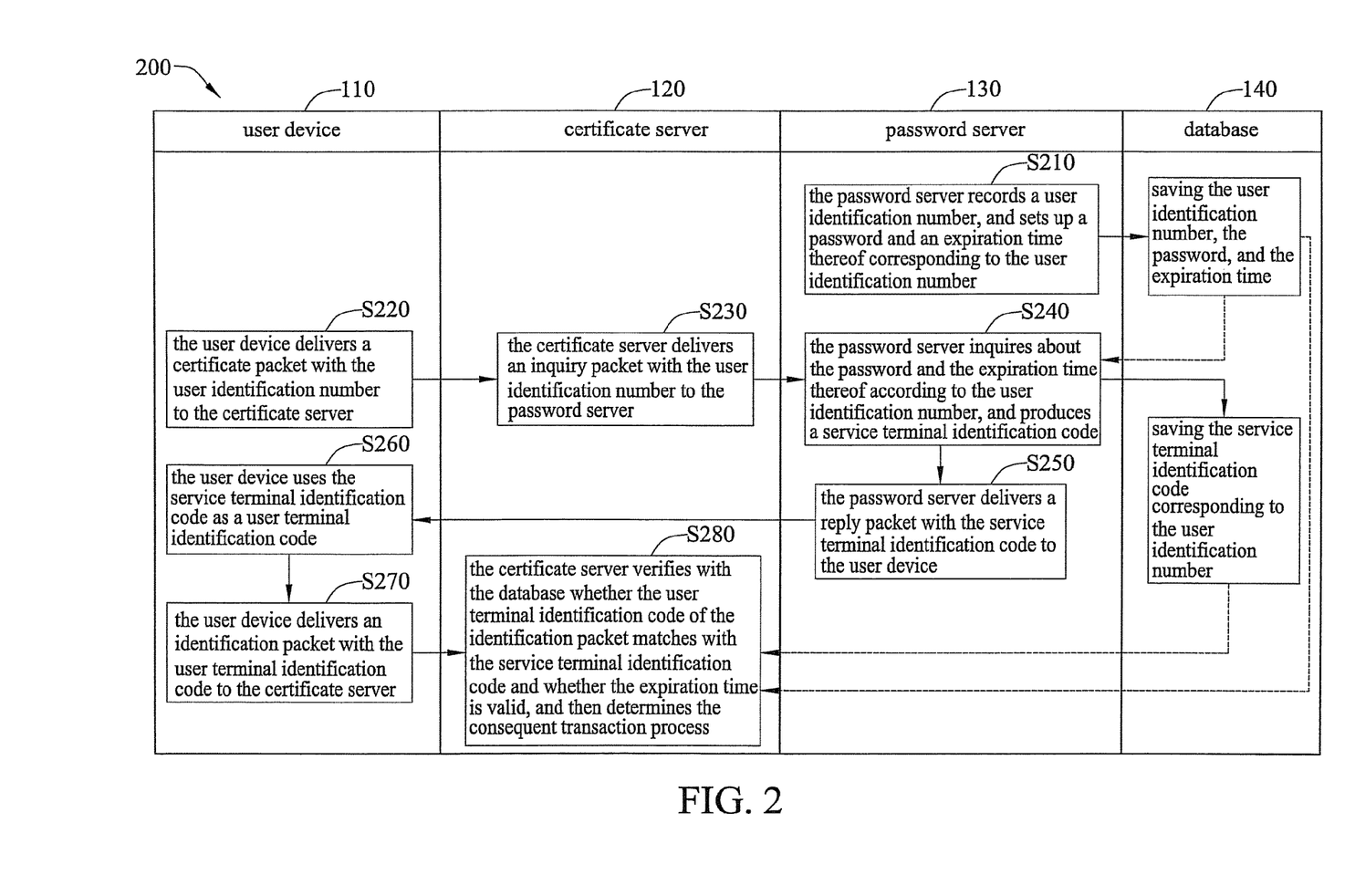
FIG. 2 is a flowchart depicting a user identification method of an embodiment according to the present invention applicable to network transaction.

In accordance with FIG. 1, FIG. 2 is a flowchart showing a user identification method 200 of an embodiment according to the present invention applicable to a network transaction. As shown in FIG. 2, the user device 110, the certificate server 120, the password server 130, and the database 140 perform the following steps in a configuration mode.

In step S210, the password server 130 records a user identification number, and sets up a password and an expiration time thereof corresponding to the user identification number. Next, the method proceeds to step S220.

It should be noted that, before a user wants to start using a network transaction via the user identification method of the present invention applicable to network transaction, the user must carry out a registration procedure. More particularly, the user can register the user identification number by visiting at a service terminal providing the network transaction, and the registration can be carried out at the first time the user starts using the network transaction, updating corresponding user identification number of user's registered cellular phone number, or, when the user is replaced with a new user device 110. By means of the registration procedure, the service terminal pre-saves the user identification number and a corresponding password and expiration time thereof in the database 140, thereby providing for subsequent user identification, as described in following steps S220 through S280.

In step S220, the user device 110 delivers a certificate packet with the user identification number to the certificate server 120 via a first network 160. Next, the method proceeds to step S230.

In step S230, the certificate server 120 delivers an inquiry packet with the user identification number to the password server 130. Next, the method proceeds to step S240.

In step S240, the password server 130 inquires the database 140 about the password and expiration time based on the user identification number. It should be noted that, if a password corresponding to the user identification number does not exist or the expiration time is invalid, the password server 130 produces another set of password, e.g. a password generated by random number, and then saves the another set of password and expiration time corresponding to the user identification number in the database 140. Also, the password server 130 uses the another set of password and the user identification number to produce a service terminal identification code by means of Hash Algorithm, and then saves the service terminal identification code and the expiration time in the database 140. Next, the method proceeds to step S250.

In step S250, the password server 130 delivers a reply packet with the service terminal identification code to the user device 110 via a second network 170. Next, the method proceeds to step S260.

In step S260, the user device 110 uses the service terminal identification code as the user terminal identification code. Next, the method proceeds to step S270.

In step S270, the user device 110 delivers an identification packet with the user terminal identification to the certificate server 120 via the first network 160, and further delivers the transaction content to the certificate server 120 via the first network 160. Next, the method proceeds to step S280.

In step S280, the certificate server 120 verifies the validity of the user terminal identification code and expiration time of the identification packet with the service terminal identification code and expiration time stored in the database 140. After having verified that the two identification codes are matched and the expiration time is valid, the certificate server 120 delivers the transaction content to a transaction platform 150, and then the transaction platform 150 executes the transaction content. Otherwise, after having verified that the two identification codes are not matched or the expiration time is invalid, the certificate server 120 stops delivering the transaction content.

It should be noted that in step S250, the service terminal identification code of the reply packet transmitted from the password server 130 to the user device 110 not only can be produced by using the password and the user identification number, but also can be replaced with the password corresponding to the user identification number. Correspondingly, in step S270 the user terminal identification code of the identification packet transmitted by the user device 110 to the certificate server 120 is not restricted to the service terminal identification code of the reply packet transmitted by the password server 130 to the user device 110. The user terminal identification code of the identification packet can also be produced by using the replaced password and the user identification number. In other words, the reply packets and identification packets in different embodiments can have different contents.

Figure 3:
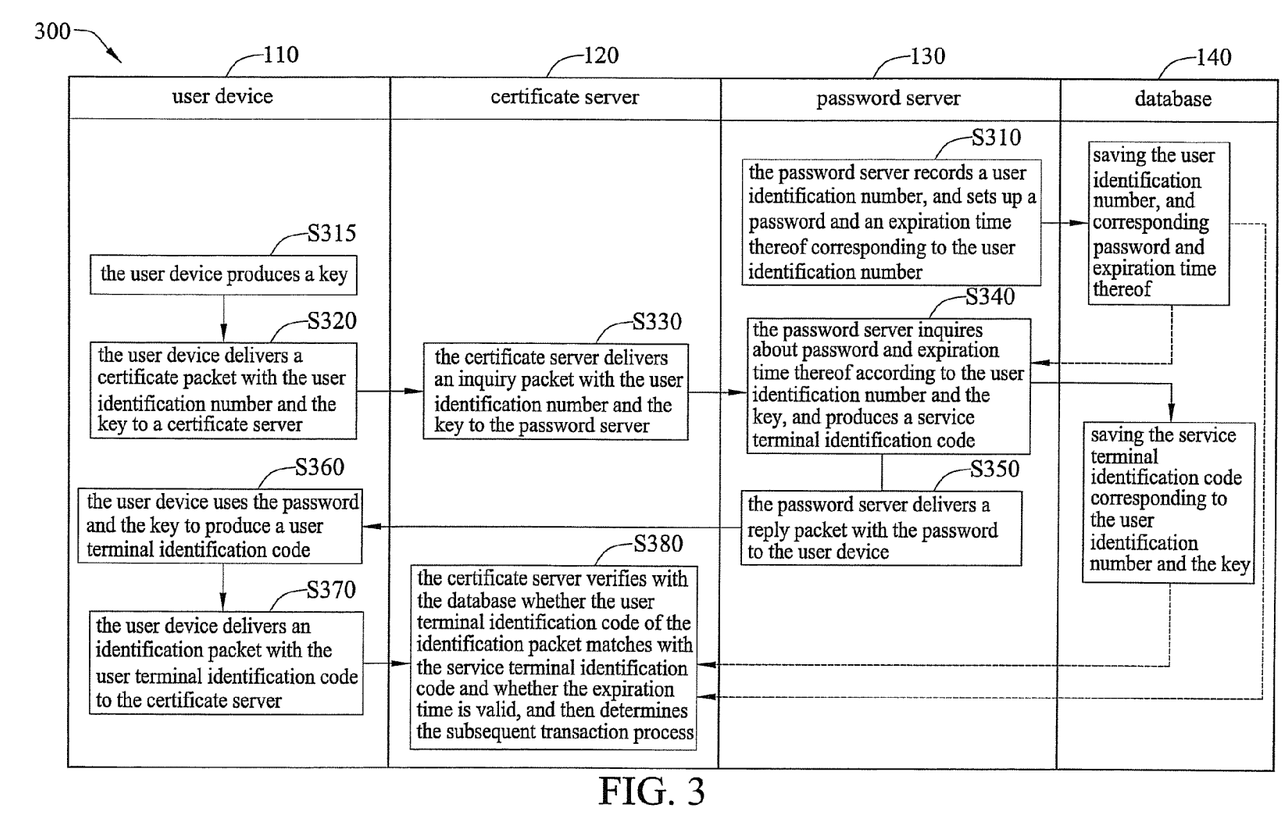
FIG. 3 is a flowchart depicting another a user identification method of another embodiment according to the present invention applicable to network transaction.

In accordance with FIG. 1, FIG. 3 is a flowchart showing a user identification method 300 of another embodiment according to the present invention applicable to network transaction. As shown in FIG. 3, the user device 110, the certificate server 120, the password server 130, and the database 140 perform the following steps in a configuration mode.

In step S310, the password server 130 records a user identification number, and sets up a password and expiration time thereof corresponding to the user identification number. Next, the method proceeds to step S315. The same as in step S210, a registration procedure enables a service terminal that provides a network transaction to pre-save the user identification number and corresponding password and expiration time thereof in the database, so as for a subsequent user identification to be proceeded based thereupon.

In step S315, the user device 110 produces a key. The key is produced based on the expiration time of valid time period, e.g. one-time validity, or within 3, 5, or other specified minutes, at the beginning of valid time period by random number. Next, the method proceeds to step S320.

In step S320, the user device 110 delivers a certificate packet with the user identification number and the key to the certificate server 120 via a first network 160. Next, the method proceeds to step S330.

In step S330, the certificate server 120 delivers an inquiry packet with the user identification number and the key to the password server 130. Next, the method proceeds to step S340.

In step S340, the password server 130 inquires the database 140 about password and expiration time based on the user identification number and the key. When the key corresponding to the user identification number does not exist in the database 140, the key corresponding to the user identification number is saved. Besides, the same as mentioned in step S240, if a password corresponding to the user identification number and the key does not exist or the expiration time is invalid, the password server 130 produces another set of password, e.g. a password produced by random number or the key, and then saves the another set of password and the expiration time thereof corresponding to the user identification number and the key in the database 140. Also, the password server 130 uses the another set of password and the key to produce a service terminal identification code, e.g., an identification code produced by means of Hash Algorithm, and then saves the service terminal identification code and the expiration time in the database 140. Next, the method proceeds to step S350.

In step S350, the password server 130 delivers a reply packet with the password to the user device 110 via a second network 170. Next, the method proceeds to step S360.

In step S360, the user device 110 uses the password and the key to produce a user terminal identification code. In an embodiment of the present invention, the user device 110 uses the password and the key to produce the user terminal identification code by means of Hash Algorithm. Next, the method proceeds to step S370.

In step S370, the user device 110 transmits an identification packet with the user terminal identification code to the certificate server 120 via the first network 160, and further transmits the transaction content to the certificate server 120 via the first network 160. Next, the method proceeds to step S380.

In step S380, the certificate server 120 verifies with the database 140 whether the user terminal identification code of the identification packet matches with the service terminal identification code and whether the expiration time is valid, so as to determine subsequent transaction steps to be proceeded. If the two identification codes are matched and the expiration time is valid, the certificate server 120 delivers the transaction content to a transaction platform 150 for the transaction platform 150 to execute the transaction content. If the two identification codes are not matched or the expiration time is invalid, the certificate server 120 stops delivering the transaction content.

It should be noted that in step S350, the password in the reply packet transmitted from the password server 130 to the user device is not restricted to those stated herein, and can also be replaced with the service terminal identification code. Correspondingly, in step S370 the user terminal identification code of the identification packet transmitted by the user device 110 to the certificate server 120 is not necessarily produced by the password of the reply packet transmitted by the password server 130 to the user device 110. The user terminal identification code of the identification packet can also be produced by using the replaced service terminal identification code. In other words, the reply packets and identification packets in different embodiments can have different content.

Figure 4A:
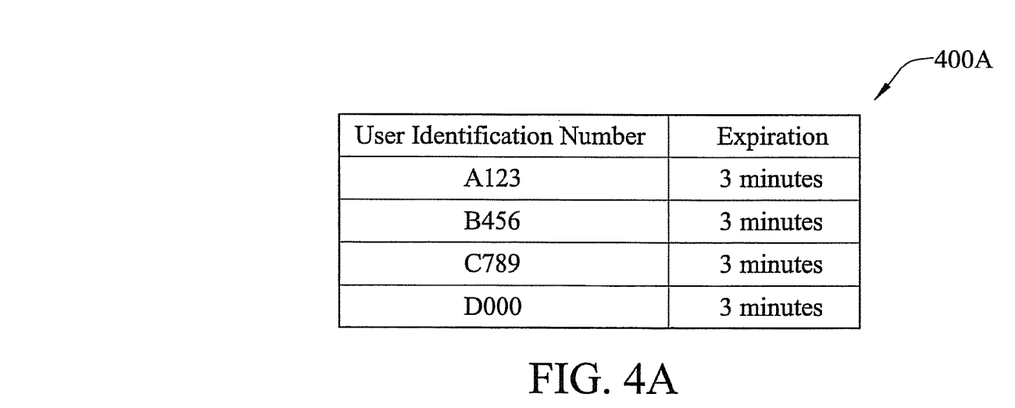
FIG. 4A is a corresponding relation table of user identification number and expiration time pre-saved in a database according to the user identification method according to the present invention applicable to network transaction and system thereof.
Figure 4B:
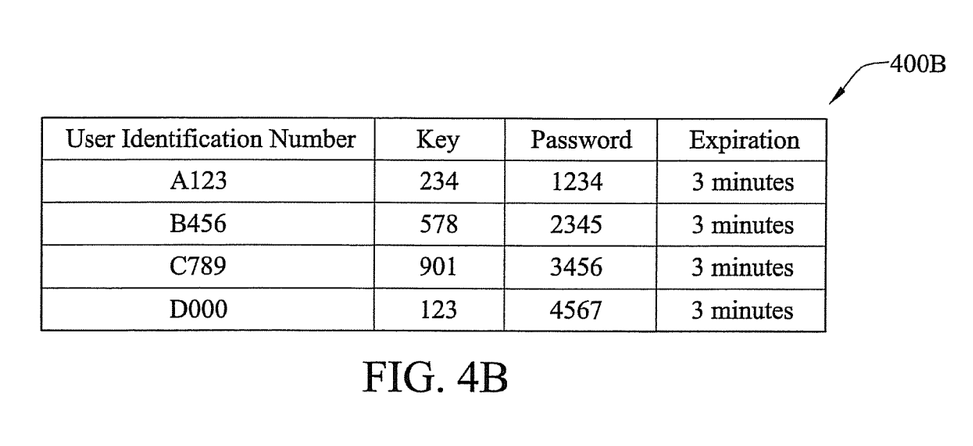
FIG. 4B is a corresponding relation table of user identification number, key, password, and expiration time pre-saved in the database according to the user identification method according to the present invention applicable to network transaction and system thereof.
Figure 5:
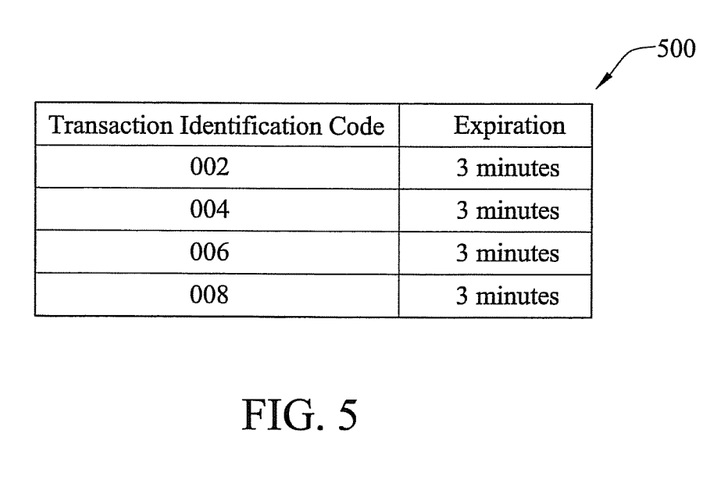
FIG. 5 is a corresponding relation table of service terminal identification code and expiration time pre-saved in the database according to the user identification method according to the present invention applicable to network transaction and system thereof

Referring to FIGS. 4A, 4B, and 5, an embodiment of how to produce a password based on a user identification number and a key pre-saved in the database according to the user identification method of the present invention applicable to network transaction and system thereof is shown. This embodiment is an example only, and is not limited to the specification herein.

According to the previous description, before a user start using a network transaction via the user identification method of the present invention applicable to network transaction and system thereof, the user must carry out a registration procedure when the user first starts using the network transaction service, replacing with a new cell phone, changing the user account number of the cell phone number registered by the user, the user must record a unique serial number and/or user account number of the user's cell phone via an administrator capable of accessing to the password server and making required changes, and setting up an expiration time as well, e.g., one-time validity, or validity within 3, 5, or other specific minutes, as shown in FIG. 4A, which is a corresponding relation table 400A of user identification number and expiration time.

Next, when a user is to process a network transaction, the user logs in a network transaction system and clicks on option of network transaction. At this moment, the user uses his/her cellular phone or computer to deliver a certificate packet including a user identification number, e.g. A123, and a key, e.g. 234, to the certificate server via the Internet.

After that, the certificate server delivers to the password server an inquiry packet including the user identification number and the key, user identification number A123 and Key 234. Then, the password server inquires about a password and an expiration time thereof based on the user identification number and the key. When the key corresponding to the user identification number does not exist in the database, the key corresponding to the user identification number is saved in the database, e.g. user identification number A123 and key 234. If the password corresponding to the user identification number and the key does not exist, the password server produces another set of password by using random number, and then updates and saves the another set of password and the expiration time corresponding to the user identification number and the key in the database, as shown in FIG. 4B, which is a corresponding relation table 400B of user identification number, key, password, and expiration time.

If the expiration time of the password corresponding to the user identification number and the key is expired, e.g. exceeding 3 minutes, the password server uses random number to produce another set of password, and then updates and saves the another set of password and the expiration time thereof corresponding to the user identification number in the database.

Furthermore, after updating and saving the another set of password and the expiration time thereof corresponding to the user identification number and the key in the database, the password server uses the another set of password and the key, e.g. key 234 and password 1234, to produce a service terminal identification code by means of Hash Algorithm, e.g. service terminal identification code 002, and then saves the identification code and the expiration time in the database, as shown in FIG. 5, which is a corresponding relation table 500 of service terminal identification code and expiration time.

Afterward, the password server delivers a reply packet with the another set of password, e.g. password 1234, to the user's cellular phone via a mobile communication network. Next, the user's cellular phone uses the another set of password and the key to produce a user terminal identification code by means of Hash Algorithm.

Subsequently, the user's cellular phone or computer delivers an identification packet including the user terminal identification code, e.g. the user terminal identification code 002, to the certificate server via the Internet, and the user's cell phone or computer further delivers the transaction content to the certificate server via the Internet.

Accordingly, the certificate server verifies the validity of the user terminal identification code of the identification packet and the expiration time with the service terminal identification code and expiration time saved in the database. If the user terminal identification code matches with the service terminal identification code and the expiration time is valid, the certificate server delivers the transaction content to a transaction platform, for the transaction platform to execute the transaction content. If the user terminal identification code does not match with the service terminal identification code or the expiration time is invalid, the certificate server stops delivering the transaction content.

In view of the above, the present invention provides a user identification method applicable to a network transaction and system thereof. A password is produced by a password server, and a user terminal identification code is also produced by using a user identification number for providing a user device 110 with user identification in a network transaction. In addition to using the password server to produce the password, the service terminal providing the network transaction further uses the key obtained by the user device 110 in the process of network transaction to produce the service terminal identification code, together with the password, enabling the user of the user device 110 to produce the user terminal identification code. Therefore, the present invention provides the user with the advantages of both enhanced security and convenience with no need of changing the password and user terminal identification code within a specific expiration time.

The invention has been described using exemplary preferred embodiments. However, it is to be understood that the scope of the invention is not limited to the disclosed embodiments. On the contrary, it is intended to cover various modifications and similar arrangements. The scope of the claims, therefore, should be accorded the broadest interpretation so as to encompass all such modifications and similar arrangements.

What is claimed is:

1. A user identification method applicable to a network transaction, comprising the following steps:
   (1) having a user device deliver a certificate packet to a certificate server via a first network, the certificate packet including a user identification number;
   (2) having the certificate server deliver an inquiry packet to a password server, the inquiry packet including the user identification number;
   (3) having the password server inquire a database about a password and an expiration time thereof corresponding to the user identification number;
   (4) having the password server deliver a reply packet to the user device via a second network, the reply packet including a code;
   (5) having the user device use the code to produce a user terminal identification code;
   (6) the user device delivering an identification packet to the certificate server via the first network, the identification packet including the user terminal identification code; and
   (7) having the certificate server verify validity of the user terminal identification code and expiration time with the database, so as to determine whether a user of the user device is allowed to proceed a subsequent transaction,
   Wherein in step (4), the code is a service terminal identification code, and the service terminal identification code is produced by using the user identification number and the password, and in step (5), the user terminal identification code is produced by using the service terminal identification code.

2. The user identification method of claim 1, wherein in step (3), when a corresponding password of the user identification number does not exist or the expiration time is invalid, the following steps are executed:
   (3-1) having the password server produce the password, and then save the password and the expiration time thereof corresponding to the user identification number in the database; and
   (3-2) having the password server use the password and the user identification number to produce a service terminal identification code, and then save the service terminal identification code and the expiration time in the database.

3. The user identification method of claim 1, wherein step (6) further comprises: having the user device deliver transaction content to the certificate server via the first network.

4. The user identification method of claim 3, wherein step (7) further comprises: after having verified the user terminal identification code and the expiration time to be valid, having the certificate server deliver the transaction content to a transaction platform, and then having the transaction platform proceed to a transaction process based on the transaction content.

5. The user identification method of claim 3, wherein step (7) further comprises: after having verified the user terminal identification code or the expiration time to be invalid, having the certificate server stop delivering the transaction content.

6. The user identification method of claim 5, further comprising, prior to the step (1):
   (1-1) having the password server record the user identification number, and setting up a password corresponding to the user identification number and an expiration time thereof; and
   (1-2) having the password server use the another password and the user identification number to produce a service terminal identification code, and then save the service terminal identification code and the expiration time such that, in step (7), the certificate server is enabled to verify validity of the user terminal identification code according to whether the user terminal identification code with the service terminal identification code.

7. The user identification method of claim 6, wherein the certificate packet in step (1) and the inquiry packet in step (2) further comprise a key, and in step (3), the password server inquires the database about the password and expiration time thereof based on the user identification number and the key.

8. The user identification method of claim 7, wherein, prior to step (1), the password server produces the key, and in step (3), if the key corresponding to the user identification number does not exist in the database, the password server saves the key corresponding to the user identification number in the database.

9. The user identification method of claim 6, wherein, prior to step (1), the password server records the user identification number, and sets up a password and expiration time thereof corresponding to the user identification number.

10. The user identification method of claim 5, wherein the certificate packet in step (1) and the inquiry packet in step (2) further comprise a key, and in step (3), the password server inquires the database about the corresponding password and expiration time based on the user identification number and the key.

11. The user identification method of claim 10, wherein, prior to step (1), the user device produces the key, and in step (3), when the key corresponding to the user identification number does not exist in the database, the key corresponding to the user identification number is saved in the database.

12. A user identification method applicable to a network transaction, comprising the following steps:
    (1) having a user device deliver a certificate packet to a certificate server via a first network, the certificate packet including a user identification number;
    (2) having the certificate server deliver an inquiry packet to a password server, the inquiry packet including the user identification number;
    (3) having the password server inquire a database about a password and an expiration time thereof corresponding to the user identification number;
    (4) having the password server deliver a reply packet to the user device via a second network, the reply packet including a code;
    (5) having the user device use the code to produce a user terminal identification code;
    (6) the user device delivering an identification packet to the certificate server via the first network, the identification packet including the user terminal identification code; and
    (7) having the certificate server verify validity of the user terminal identification code and expiration time with the database, so as to determine whether a user of the user device is allowed to proceed a subsequent transaction,
    wherein in step (4), the code is the password corresponding to the user identification number, and in step (5), the user terminal identification code is produced by using the user identification number and the password.

13. A user identification system applicable to a network transaction, comprising:
    a certificate server for identifying user identity;
    a password server for producing passwords and service terminal identification codes;

a database for saving the service terminal identification code and an expiration time; and a user device connected to the certificate server and the password server via a first network and a second network, respectively;

wherein the user device delivers a certificate packet with a user identification number to the certificate server via the first network, and then the certificate server delivers an inquiry packet with the user identification number to the password server; afterward, the password server inquires about the password and the expiration time based on the user identification number, and then delivers a reply packet with a code to the user device via the second network, thereby enabling the user device to produce a user terminal identification code by using the code, and further to deliver an identification packet with the user terminal identification code to the certificate server via the first network; and the certificate server verifies with the database if the user terminal identification code matches with the service terminal identification code and if the expiration time is valid, and wherein the code is the service terminal identification code or the password.

14. The user identification system of claim 13, wherein the certificate packet delivered from the user device to the certificate server further comprises a key, whereby the inquiry packet transmitted by the certificate server to the password server further comprises the key, allowing the password server to inquire with the database about the password and the expiration time based on the user identification number and the key.

* * * * *